(12) United States Patent
Okabayashi et al.

(10) Patent No.: US 7,120,519 B2
(45) Date of Patent: Oct. 10, 2006

(54) REMOTE-CONTROLLED ROBOT AND ROBOT SELF-POSITION IDENTIFICATION METHOD

(75) Inventors: Keiju Okabayashi, Kawasaki (JP); Miwa Okabayashi, Kawasaki (JP); Yuichi Murase, Kawasaki (JP); Katsutoshi Shimizu, Kawasaki (JP); Sumihisa Iwashita, Kawasaki (JP); Naoyuki Sawasaki, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 10/978,439

(22) Filed: Nov. 2, 2004

(65) Prior Publication Data
US 2005/0071047 A1 Mar. 31, 2005

Related U.S. Application Data

(63) Continuation of application No. PCT/JP02/05370, filed on May 31, 2002.

(51) Int. Cl.
*G06F 19/00* (2006.01)

(52) U.S. Cl. ............... 700/254; 700/258; 318/568.1; 318/568.11

(58) Field of Classification Search ............... 700/245, 700/258; 318/658.1, 568.11; 701/23
See application file for complete search history.

(56) References Cited

U.S. PATENT DOCUMENTS

| | | | |
|---|---|---|---|
| 5,378,969 A | 1/1995 | Haikawa et al. | |
| 5,890,808 A | 4/1999 | Neff et al. | |
| 5,999,866 A | 12/1999 | Kelly et al. | |
| 6,154,566 A | 11/2000 | Mine et al. | |
| 6,368,177 B1 * | 4/2002 | Gabai et al. | 446/404 |
| 6,389,402 B1 * | 5/2002 | Ginter et al. | 705/51 |
| 6,721,462 B1 * | 4/2004 | Okabayashi et al. | 382/278 |

FOREIGN PATENT DOCUMENTS

| | | |
|---|---|---|
| EP | 1 152 617 | 11/2001 |
| JP | 11-283152 | 10/1999 |
| JP | 2000-202792 | 7/2000 |
| JP | 2000-342498 | 12/2000 |
| JP | 2002-85305 | 3/2002 |
| JP | 2002-135259 | 5/2002 |

OTHER PUBLICATIONS

Thrum et al., Probabilistic algorithms and the interactive museum tour-guide robot Minerva, 2000, Internet, p. 1-35.*
Notification of Transmittal of Copies of Translation of the International Preliminary Examination Report and International Preliminary Examination Report for corresponding Appln. No. PCT/JP2002/005370 dated Feb. 17, 2005.

(Continued)

*Primary Examiner*—Thomas Black
*Assistant Examiner*—McDieunel Marc

(57) ABSTRACT

A remotely controlled robot comprises a unit storing the layout plan of a building, a unit receiving a position remotely designated in the layout plan from a remote location and a unit controlling the travel of the robot to the designated position. A self-position identification method is implemented by a robot with a camera whose shooting direction can be changed. The robot takes in advance a panoramic picture of a room where the robot may travel, generates a reference picture by extracting a plurality of block pictures from the panoramic picture and identifies a room where the robot is located, by applying correlation and DP matching, using both a picture taken in the room where the robot is located and the reference picture.

15 Claims, 20 Drawing Sheets

OTHER PUBLICATIONS

Patent Abstracts of Japan, vol. 2002, No. 07, Jul. 2, 2002 & JP 2002-085305 (Toshiba Tec Corp) Mar. 26, 2002.

Patent Abstracts of Japan, vol. 2000, No. 10, Nov. 17, 2000 & JP 2000 202792 (Sharp Corp) Jul. 25, 2000.

Xiao Ou Ren et al., "An intelligent service robot using purposive vision" Systems, Man and Cybernetics, 1995. Intelligent Systems for the 21st Century., IEEE Int'l Conf. On Vancouver, BC, Canada Oct. 22-25, 1995, New York, NY, vol. 4, Oct. 22, 1995, pp. 3684-3689 XP010194870.

Patent Abstracts of Japan, vol. 2000, No. 15, Apr. 6, 2001, & JP 2000 342498 (Toyota Autom Loom Works LTD), Dec. 12, 2000.

Patent Abstracts of Japan, vol. 13, No. 375 (P-921), Aug. 21, 1989, & JP 01 128152 (Mitsubishi Electric Corp), May 19, 1989.

Search Report for corresponding European Appln. No. 02730841.0 dated Nov. 1, 2005.

Office Action for corresponding European Application No. 02730841.0 dated May 20, 2005.

Patent Abstracts of Japan, vol. 13, No. 375 (P-921), Aug. 21, 1989, & JP 01 128152 (Mitsubishi Electric Corp), May 19, 1989.

Nickerson, S B et al., "The ARK project: Autonomous mobile robots for known industrial environments", Robotics and Autonomous Systems, Elsevier Science Publishers, Amsterdam, NL, vol. 25, No. 1-2, Oct. 31, 1998, pp. 83-104, XP004142131.

Office Action for corresponding Korean Application No. 10-2004-7017598 dated Apr. 28, 2006.

* cited by examiner

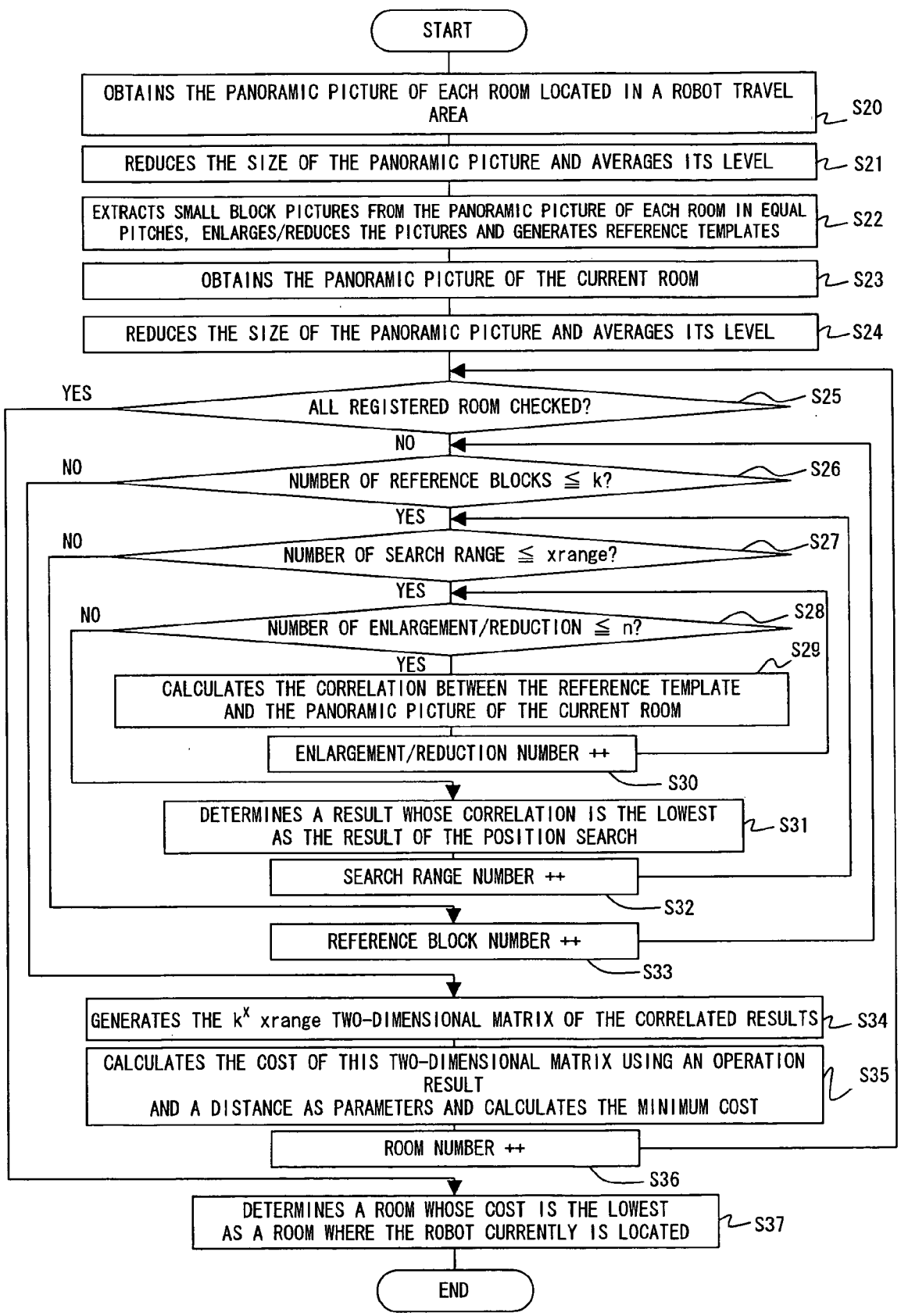
F I G. 1 2

REMOTE-CONTROLLED ROBOT AND ROBOT SELF-POSITION IDENTIFICATION METHOD

CROSS REFERENCE TO RELATED APPLICATION

This application is a continuation of international PCT application No. PCT/JP02/05370 filed on May 31, 2002.

BACKGROUND OF THE INVENTION

1. Field of the Invention

The present invention relates to a technology for controlling and using a robot. In particular, it relates to a technology for controlling and using a robot, where a robot can be remotely controlled, for example, through the Internet when it is located in a building. It also relates to a robot self-position identification method for recognizing the exact current position and direction of a robot.

2. Description of the Related Art

Conventionally, an Internet camera has been used to remotely monitor a person's home while he/she is away. However, this Internet camera is fixed in a specific location, and in order to monitor each room of a building, such a camera must be installed in each room. Furthermore, the connection between a plurality of cameras and a host computer becomes complex and the cost increases, which is a problem.

In order to remotely control electrical appliances in a person's home while he/she is away, digital home appliances that can be connected to LAN have been being developed. However, conventional electrical home appliances that cannot be connected to LAN cannot be remote-controlled, which is another problem.

Furthermore, for example, in order for an autonomous moving robot that can travel in a building to do work as instructed by a user, the own position of the robot must be recognized. Generally, in order for a robot to autonomously travel, a landmark, such as a white line, etc., which is easy for a robot to recognize, is needed.

However, it is impossible to attach a characteristic landmark to an average house. Even if an existing characteristic point can be registered as a landmark, the size of a target on a camera screen varies depending on the position of a robot so the picture cannot easily determine the landmark, which is another problem.

An object of the present invention is to realize a remotely controlled robot whose travel destination in a building can be easily designated from a remote place and through which the state of each room can be monitored from a remote place and through which electrical home appliances located in each room can be remotely operated, at relatively low cost and with a simple configuration, and to provide a robot self-position identification method for a robot exactly fixing its own position and direction, in order to solve the problems described above.

SUMMARY OF THE INVENTION

FIG. 1 shows the basic configuration of the remotely controlled robot of the present invention. A robot 1 comprises a layout storage unit 2, a communication unit 3 and a travel control unit 4.

The layout storage unit 2 stores the layout plan of a building, such as a house, and the communication unit 3 receives a position in the layout plan that is remotely designated from a remote terminal, for example, through a network. The travel control unit 4 controls the travel of the robot 1 to the designated position.

In another preferred embodiment of the present invention, the remotely controlled robot can comprise a step getting over unit getting over a step c in a building, based on the result of step detection by an obstacle detecting sensor. The robot can further comprise a self-position identification unit identifying the current position and direction of the robot in a building, and the travel control unit 4 can control the travel of the robot 1, based on the result of the identification.

In another preferred embodiment of the present invention, the communication unit 3 shown in FIG. 1 can also receive the designation of a room in the layout plan of a building from a remote terminal. In this case, the travel control unit 4 controls the travel of the robot 1 to, for example, the entrance of the designated room.

In another preferred embodiment of the present invention, the remotely controlled robot can further comprise a picture taking unit taking a picture in a building and a communication unit transmitting a picture taken by the picture taking unit when a robot regularly or irregularly patrols inside the building, to a computer with a memory device that can be accessed from the outside through a network, such as a Web server connected to the internet. Alternatively, a robot can incorporate such a computer, such as a Web server.

In this case, the preferred embodiment can further comprise a revolution unit changing the shooting direction of the picture taking unit, and an infrared emission/reception unit emitting/receiving an infrared ray for operating equipment, such as electrical home appliances that are in parallel to the shooting direction of the picture taking unit. Alternatively, it can further comprise the step getting over unit described earlier.

In this case, furthermore, when a ringer signal is transmitted from the outside through the Internet a prescribed number of times, the communication unit can also start the computer described earlier, such as a Web server.

In another preferred embodiment of the present invention, the remotely controlled robot of the present invention comprises a script storage unit storing the script programs of one or more operations of a robot, and a communication unit receiving a command to execute one of the stored programs from the outside.

In another preferred embodiment of the present invention, the remotely controlled robot of the present invention further comprises a command receiving unit receiving an emergency notice/command which is sent to the outside from a person within a building, such as a resident of a house, and a communication unit issuing an urgent notice to a predetermined external terminal according to the command.

In this preferred embodiment, the robot can further comprise the picture taking unit taking the inside pictures of a building, the revolution unit changing the shooting direction of the picture taking unit and the communication unit transmitting pictures taken by the picture taking unit, to the outside, according to the command from the outside.

The robot self-position identification method of the present invention can be implemented by a robot with a camera whose shooting direction can be changed. The robot takes in advance the panoramic picture of each room where the robot may travel, generates a reference picture by extracting a plurality of block pictures from the panoramic picture and identifies a room where the robot is located, by applying correlation calculation and DP matching in the panoramic picture taken in a position where the robot is located, using a picture of the same size as the block picture and the reference picture.

In this preferred embodiment, the position of a landmark can also be calculated in an picture taken in the position where the robot is located, using a landmark picture taken in advance in the room as a reference template, the distance between the robot and the landmark can also be stereoscopically measured and the self-position and direction of the robot in the identified room can also be identified.

In another preferred embodiment of the present invention, a vertical line in a taken landmark picture can also be extracted and the position and direction of a robot can also be exactly identified by using two angles that are formed by one of the shooting directions of two cameras and the direction of the vertical line.

As described above, according to the present invention, for example, the travel destination or target room of a robot can be remotely designated in the layout plan of a building. By using the panoramic picture of each room to which a robot may travel, a room where the robot is located can be identified.

BRIEF DESCRIPTION OF THE DRAWINGS

FIG. 12 is a flowchart showing the process of identifying a room where the robot is located.

DESCRIPTION OF THE PREFERRED EMBODIMENTS

Figure 1:
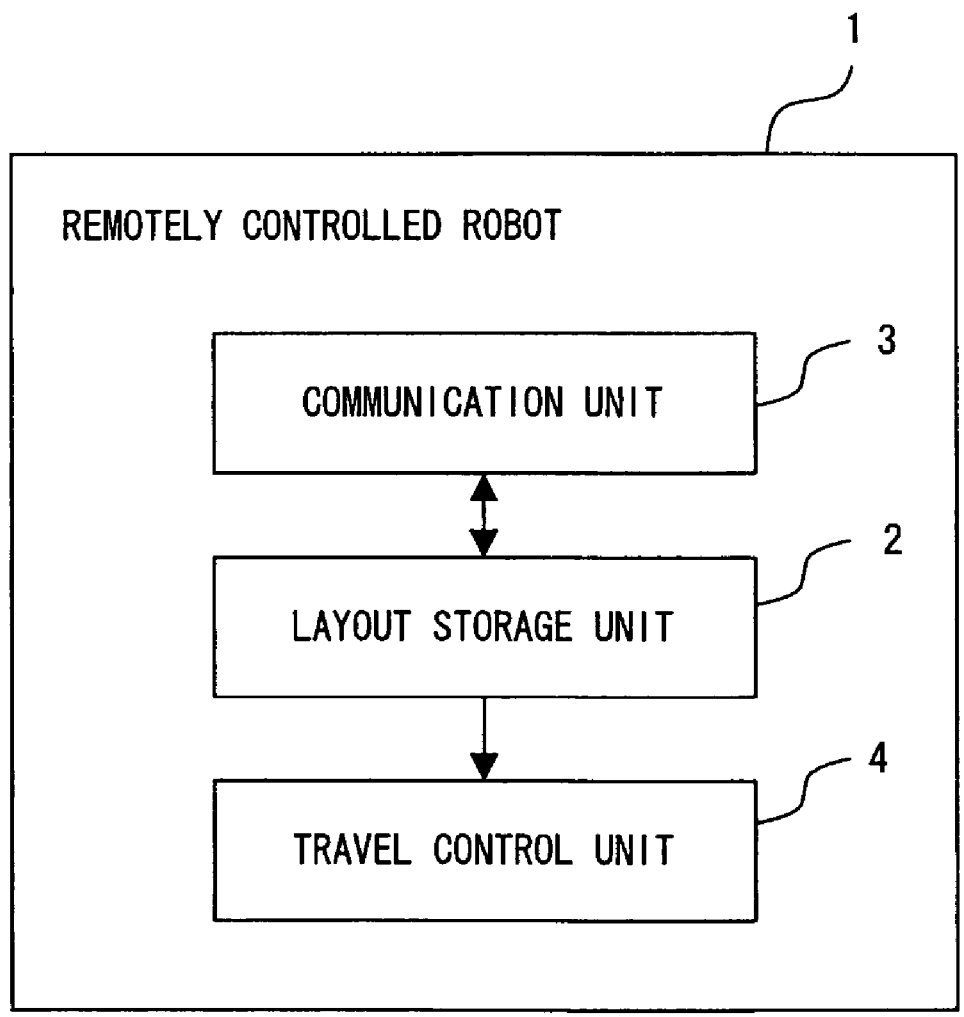
FIG. 1 shows the basic configuration of the remotely controlled robot of the present invention.
Figure 2:
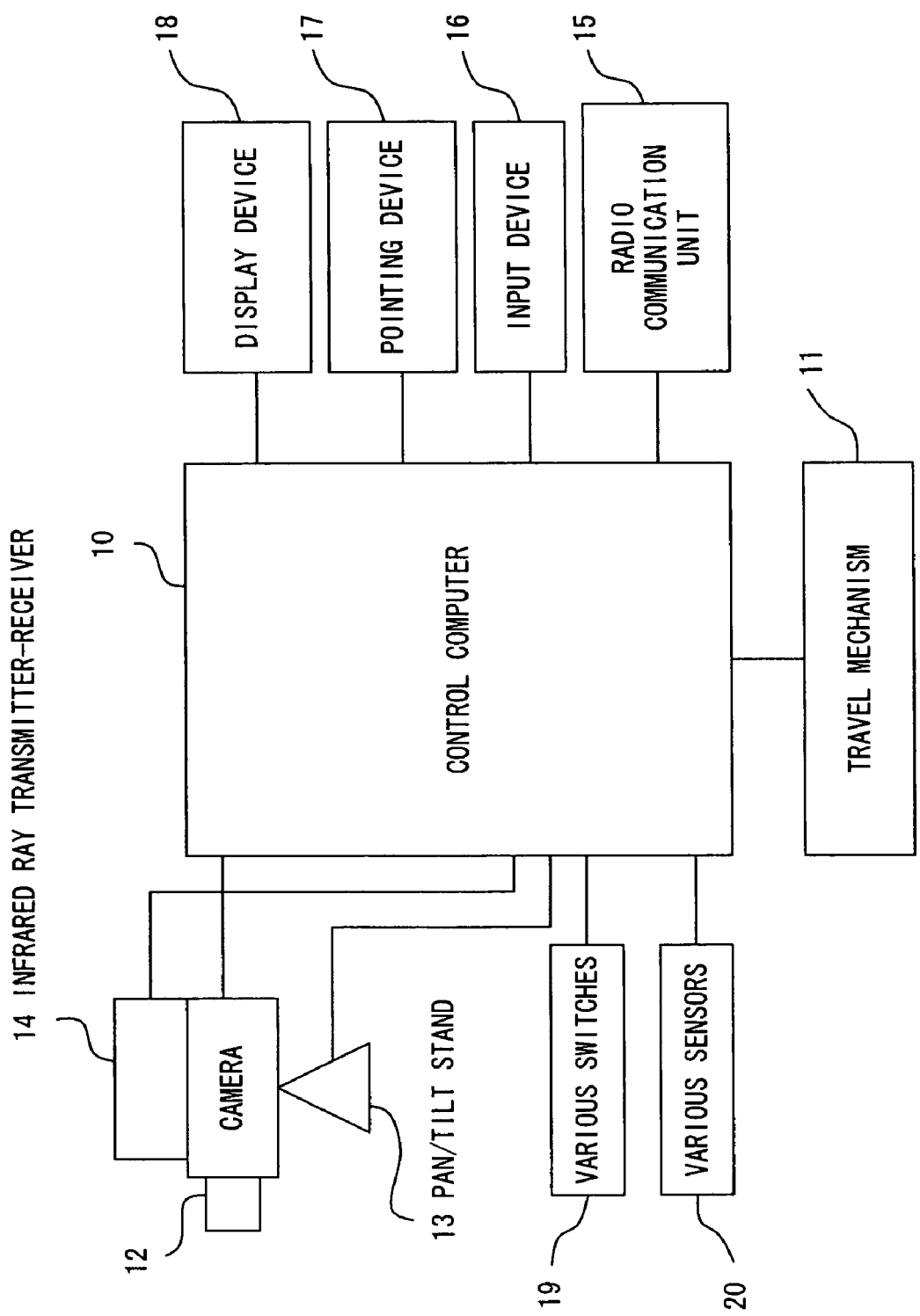
FIG. 2 shows the configuration of the remotely controlled robot in the preferred embodiment.

FIG. 2 shows the configuration of the remotely controlled robot in the preferred embodiment.

In FIG. 2, the robot comprises a control computer 10, a travel mechanism 11, a camera 12 taking pictures around the robot, a pan/tilt stand 13 for adjusting the horizontal revolution angle and elevation/depression angle of the camera, an infrared transmitter/receiver 14 that is, for example, mounted on the same base as that of the camera, transmitting infrared rays in parallel to the shooting direction of the camera and receiving infrared rays to get remote control data, a radio communication unit 15, an input device 16, a pointing device 17, a display device 18, a variety of switches 19 and a variety of sensors 20.

In FIG. 2, the camera 12 is, for example, a video camera. The infrared transmitter/receiver 14 is installed in the vicinity of the camera 12, and can transmit infrared rays in the same direction as the shooting direction. Its base can be revolved in an arbitrary direction by the pan/tilt stand 13 used as a camera revolution mechanism. For example, the transmitter/receiver 14 can transmit infrared rays in order to operate a specific electrical home appliance located in that direction while viewing the picture of the camera 12.

The radio communication unit 15 conducts communications in order to enable a portable data terminal, such as a cellular phone, a PDA (personal digital assistant) etc., or a personal computer to execute such a remote control.

Figure 3:
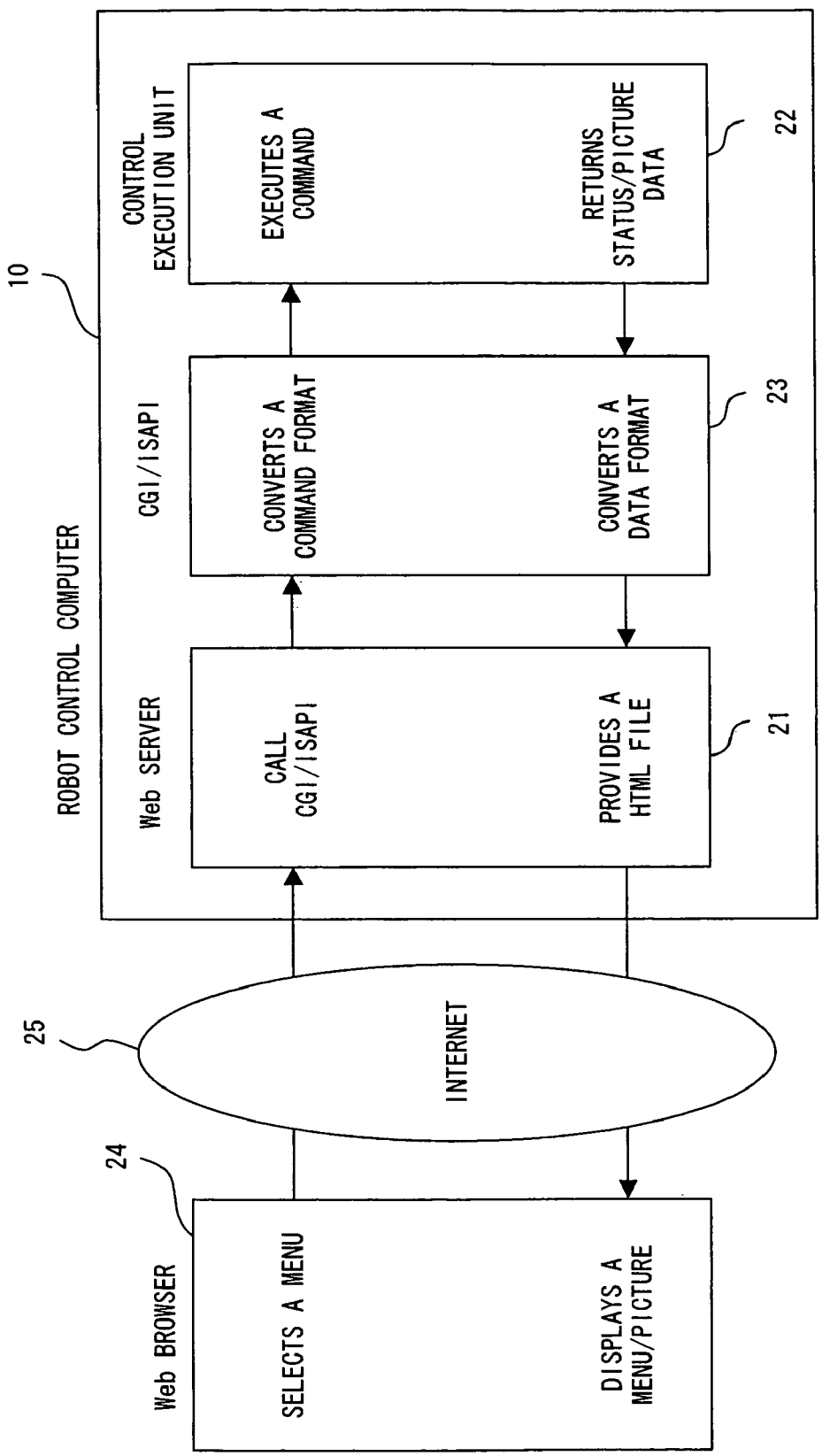
FIG. 3 shows how to remotely operate the robot.

FIG. 3 shows how to remotely operate the robot. In this preferred embodiment, the robot can be remotely controlled, for example, through the Internet, and a Web server is provided for the robot for that purpose.

In FIG. 3, the robot control computer 10 shown in FIG. 2 comprises a Web server 21, a control execution unit 22 executing control and an interface 23, such as CGI (common gateway interface), ISAPI (Internet server application programming interface) or the like, which is located between the Web server 21 and the control execution unit 22. The Web server 21 can be remotely accessed through a Web browser 24 and the Internet 25.

In FIG. 3, the Web browser 24 can be connected to the Internet 25 by menu selection. In the Web server 21, the CGI/ISAPI 23 is called according to a command from the Web browser 24. Then, in the CGI/ISAPI 23, the command format is converted into a format suited to control the robot. Then, the control execution unit 22 executes the command.

From the control computer 10, status and picture data that are returned from the control execution unit 22 are transmitted to the CGI/ISAPI 23, and its data format is converted. Then, the Web server 21 provides the Web browser 24 with the status and picture data as an html file through the Internet 25. Then, the Web browser 24 displays the menu and picture.

Figure 4:
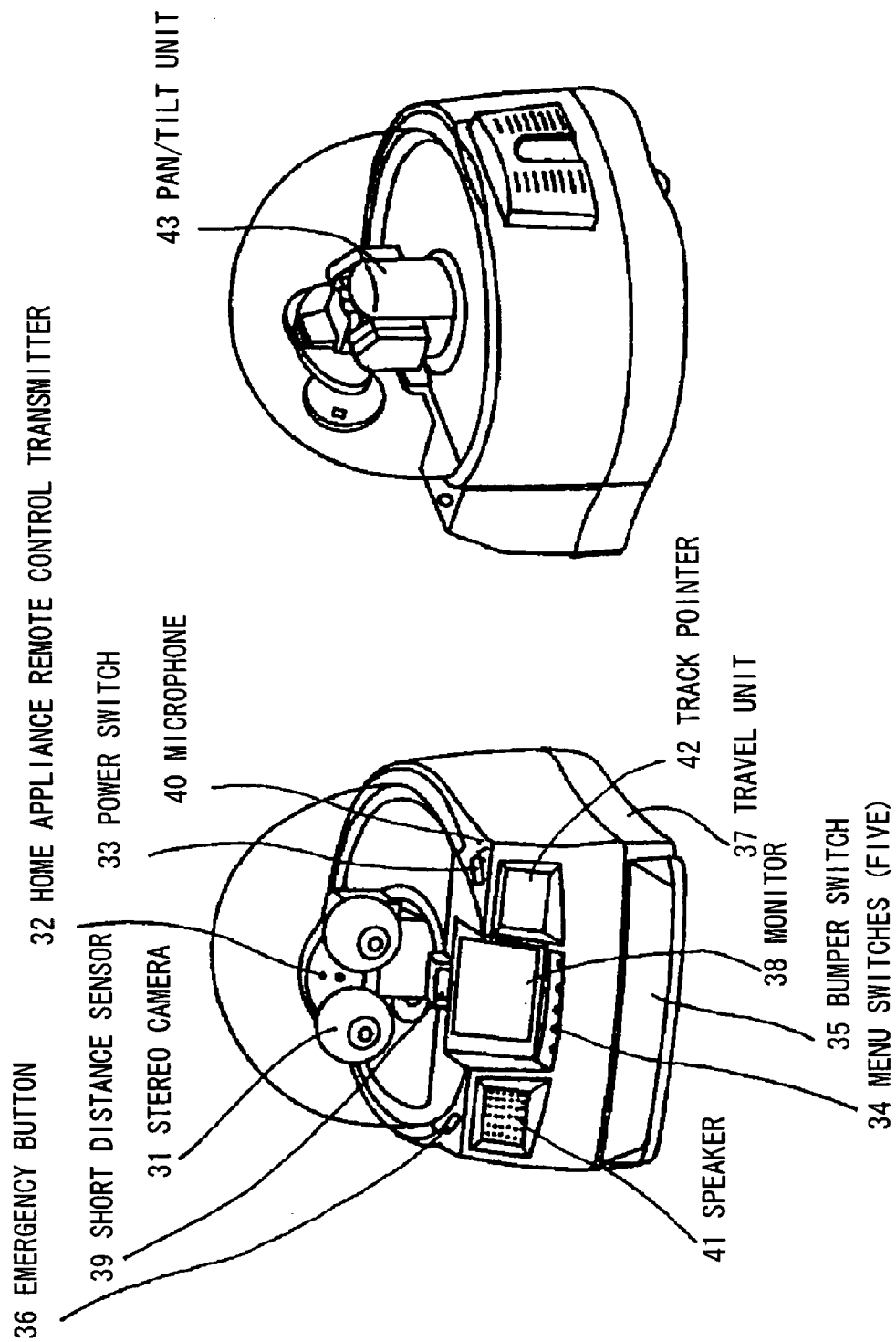
FIG. 4 shows the external appearances of the robot.

FIG. 4 shows the external appearances of the remotely controlled robot. The left and right side pictures show its front and back external appearances, respectively. On the front, a stereo camera 31 corresponding to the camera shown in FIG. 2, an electrical appliance remote control transmitter 32 corresponding to the infrared transmitter/receiver 14, a power switch 33 corresponding to the variety of switches 19, a menu switch 34, a bumper switch 35 used as an obstacle search sensor, and an emergency button 36 used for a resident of a building to issue an emergency notice to the outside, which is described later, are provided.

A travel unit 37 corresponding to the travel mechanism 11, a monitor 38 corresponding to the display device 18, a near distance sensor 39 corresponding to the variety of sensors 20, a microphone, a speaker 41 and a track pointer 42 are also provided on the front. On the back, a pan/tilt unit 43 corresponding to the pan/tilt stand 13 shown in FIG. 2 is provided.

Figure 5:
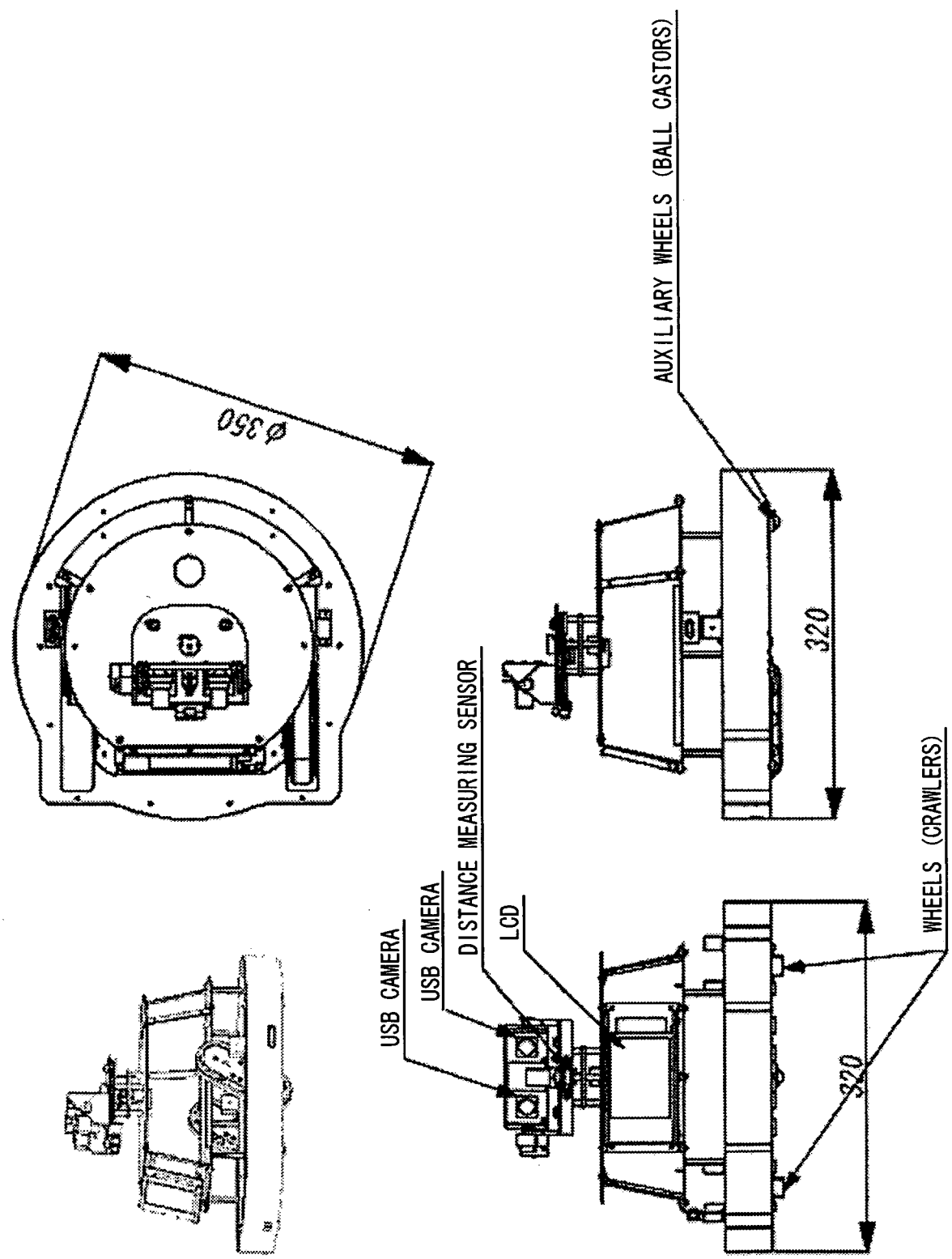
FIG. 5 shows the inside of the robot.

FIG. 5 shows the inside of the robot. In FIG. 5, a USB camera corresponding to the stereo camera 31 shown in FIG. 4, a distance measuring sensor corresponding to the near distance sensor 39 and an LCD corresponding to the monitor 38 are shown.

In this preferred embodiment, for the travel mechanism 11 of the robot, a mechanism by which the robot can get over clear obstacles and steps using two (left and right) crawlers (wheels) and one or more freely-revolving ball castors (auxiliary wheels) is used. These crawlers can revolve on a plane perpendicular to the center of the revolution axis of each wheel, and when the robot revolves at one point, they operate as if they were two (left and right) wheels rather than crawlers. Since the auxiliary wheel touches on the ground at one point, the grounding point is stable and the one-point revolution center of the entire robot is stable, the robot can get over an obstacle, which is higher than the structural base of the robot. For the steps getting over mechanism, another publicly known technology can also be used.

Figure 6:
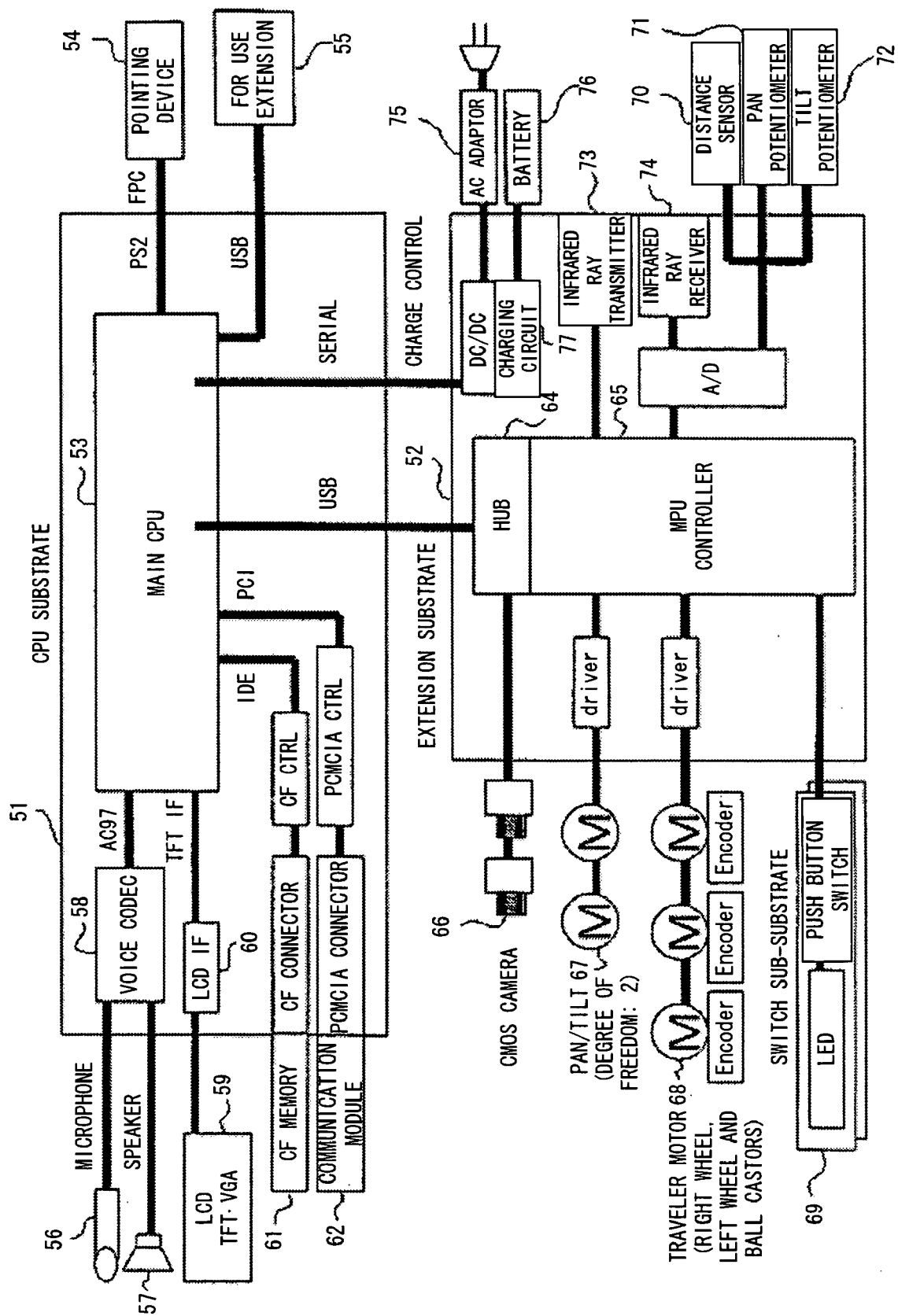
FIG. 6 shows the component configuration of a remotely controlled robot.

FIG. 6 shows the configuration of the remotely controlled robot. In FIG. 6, a main CPU 53 on a CPU substrate 51 and an MPU controller 65 on an extension substrate 52 correspond to the control computer 10 shown in FIG. 2. The Web server 21 inside the control computer 10 shown in FIG. 3 can be configured, for example, using the main CPU 53 as a center device. Alternatively, the Web server can be provided separately from the robot, which is described later. In that case, a server computer is provided separately between the robot and the Internet.

In FIG. 6, a pointing device 54, a USB (universal serial bus) port for user extension 55, a voice codec 58 with a microphone 56 and a speaker 57 connected, an LCD interface 60 with an LCD 59 connected, CF (compact flash) memory 61 connected through a control unit and a communication module 62 connected through a control unit, are connected to the main CPU 53.

A CMOS camera 66, two motors 67 controlling the rotation of the pan/tilt stand 13 shown in FIG. 2, three motors 68 rotating the crawlers and ball castors that are shown in FIG. 5 as the travel mechanism 11, a switch sub-substrate 69 with LEDs and buttons mounted, a distance sensor 70, a potentiometer for pan (horizontal rotation angle) 71, a potentiometer for tilt (elevation angle) 72, an infrared ray transmitter 73, an infrared ray receiver 74 and a DC/DC charging circuit 77 with an AC adaptor 75 and a battery 76 connected, are connected to both the MPU controller 65 and HUB 64.

Figure 7:
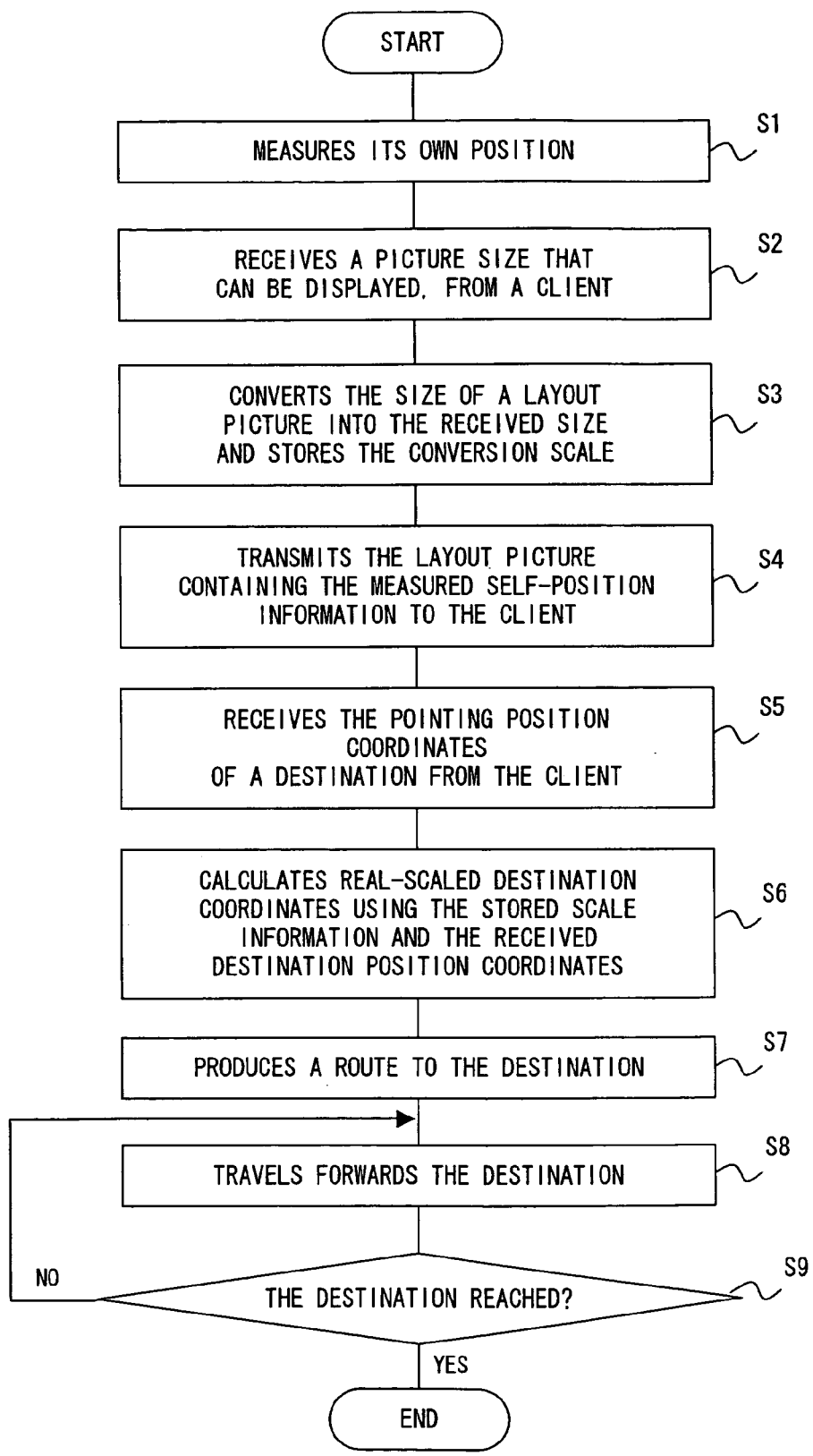
FIG. 7 is a flowchart showing the process of a robot in response to the designation of a target destination.

FIG. 7 is a flowchart showing the process of a robot receiving the designation of a target destination from a remote place, according to a layout plan. In FIG. 7, the process of a robot traveling to its destination is performed by a robot storing in advance the layout plan of a building in its memory, the robot transmitting a picture of the layout plan to the remote terminal of a client, and a client designating its travel destination for the robot, according to the layout plan.

Firstly, in step S1, the robot identifies its own position. This self-position identification is described later. Then, in step S2, the robot receives a picture size data size that can be displayed on a mobile terminal, from the remotely located client.

Then, in step S3, the size of the layout picture stored in the memory is converted into that of the data received from the client using the data and stores the conversion scale. In step S4, the robot transmits the layout picture containing the self-position information identified in step S1, to the client. In step S5, the robot receives the coordinates of the destination designated from the client.

Then, in step S6, the robot calculates the destination coordinates on a real scale from both the conversion scale information stored in step S3 and the coordinates of the destination designated by the client. In step S7, the robot produces a route to the destination. In step S8, the robot travels towards the destination. In step S9, the robot determines whether it arrives at the destination. The robot repeats the processes in steps 8 onward until it arrives at the destination. If it determines that it arrives at the destination, the process terminates.

Figure 8:
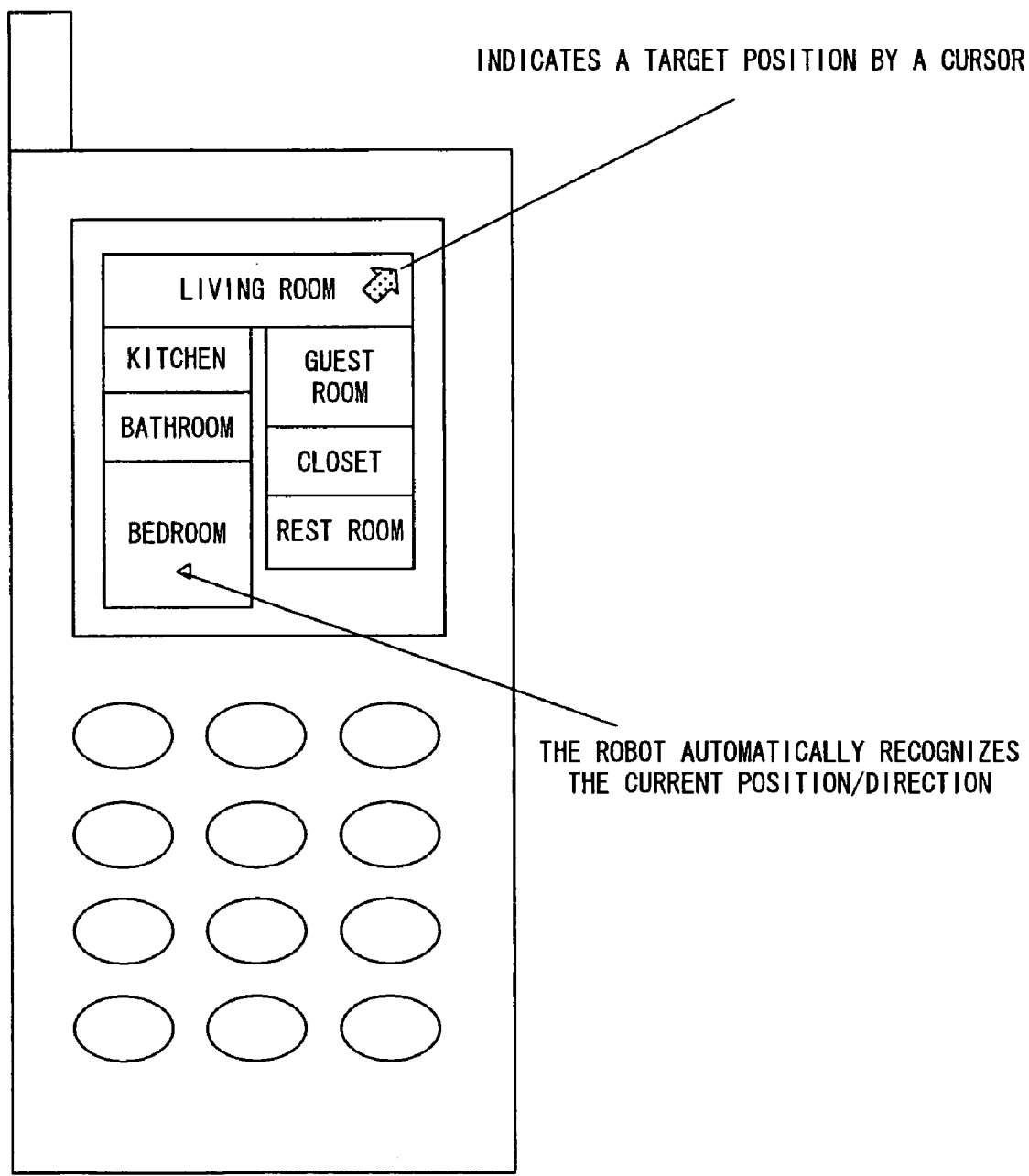
FIG. 8 shows a display example of a layout plan in a remote terminal in the process shown in FIG. 7.

FIG. 8 shows a display example of a layout plan in a remote terminal, such as a remotely located client's cellular phone, etc., in the process of FIG. 7. In FIG. 8, a layout plan is outputted on a display screen. The current position and direction of a robot are indicated there by a triangle mark in a bedroom. The destination of the robot, designated by a client is indicated by a cursor in a living room.

Figure 9:
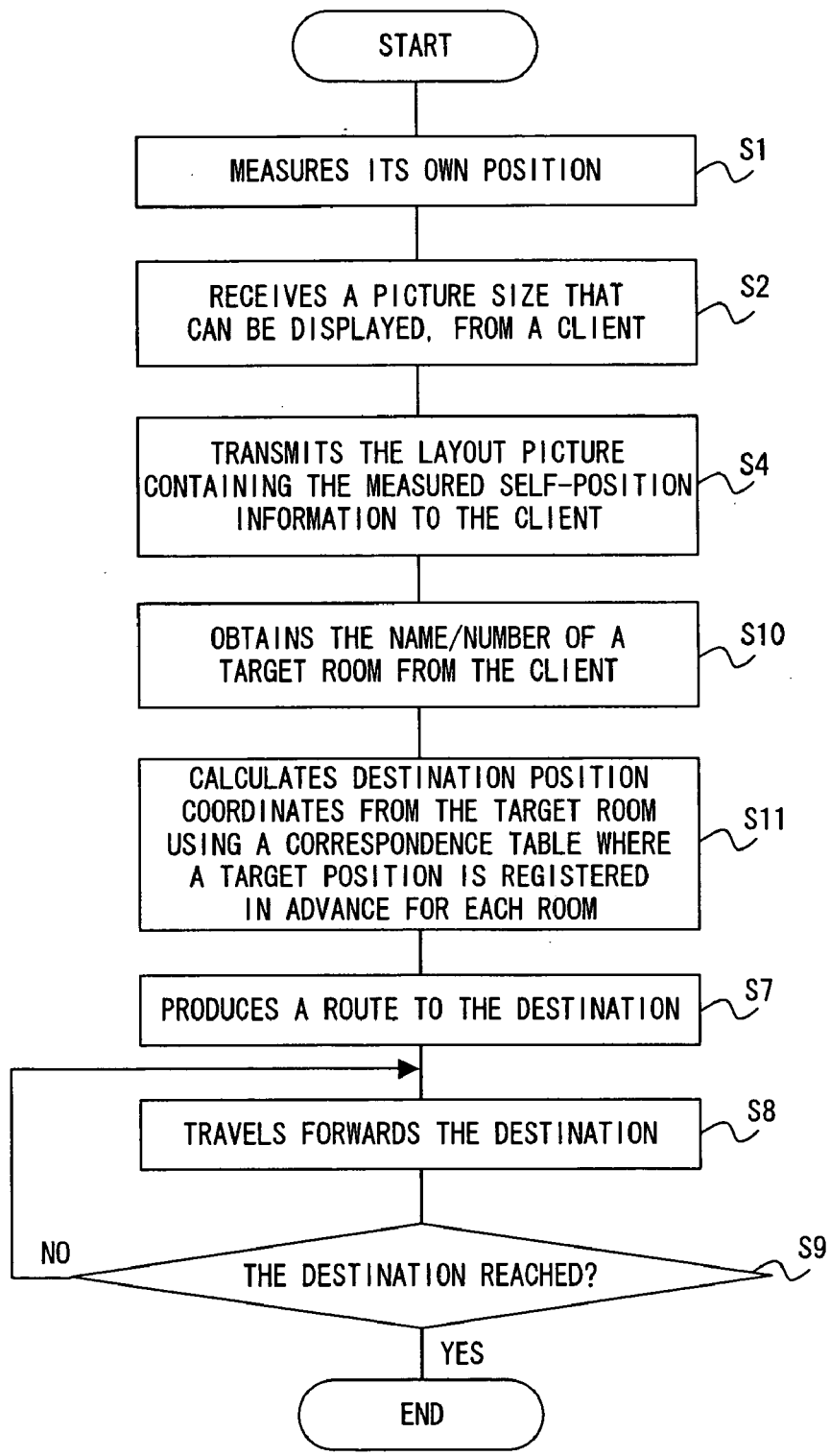
FIG. 9 is a flowchart showing the process of a robot, in which the name of a target room is designated.

FIG. 9 is a flowchart showing the process of a robot, in which a client designates the name or number of a target room, instead of a travel destination. Only the differences in a flowchart between FIGS. 9 and 7 are described below.

Since after the processes in steps S1 and S2, the client designates the name of a room, etc., instead of a target destination, there is no need to store a conversion scale in step S3 of FIG. 7. Therefore, omitting the process in step S3, in step S4, the robot transmits a layout picture containing self-position information, to the client. Then, instead of the processes in steps S5 and S6 of FIG. 7, in step S10, the robot receives the data of the name or number of a target room from the client. In step S11, the robot calculates the coordinates of a travel destination from the name or number of a target room, using a correspondence table storing in advance the coordinates of a target, such as an entrance, for each room. Then, the robot performs the same processes in step S7 through S9 as those shown in FIG. 7.

Figure 10:
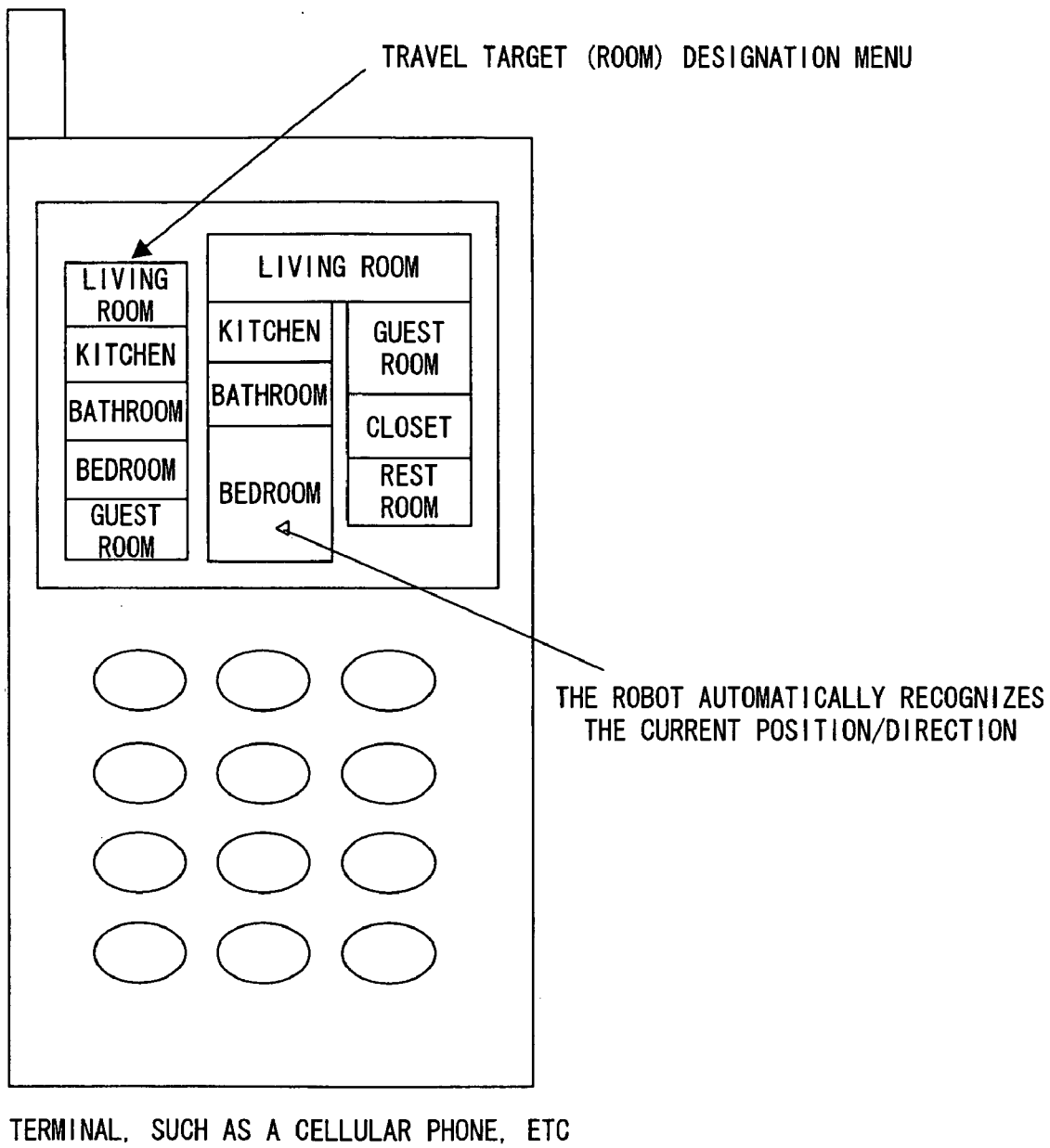
FIG. 10 shows an example of the display screen of a remote terminal, corresponding to the process shown in FIG. 9.

FIG. 10 shows an example of the display screen of a client terminal, in the process shown in FIG. 9. In FIG. 10, a menu indicating both a layout plan and a travel destination is outputted on the display screen. By the client designating a specific room in the menu, the robot travels to the room. Although in this example, a layout plan is outputted on the display screen, there is not necessarily a need to display a layout plan. By the client simply designating the name of a target room, etc., the process load can be reduced and accordingly, process speed can be improved.

Next, the robot's acquisition method of the self-position, that is, the self-position identification method in step S1 of FIG. 7, is described. In this preferred embodiment, it is assumed that a robot identifies both a room where the robot is located and its exact position by picture taking and registering in advance the panoramic picture of each room in a building and comparing the panoramic picture of each room with a panoramic picture taken by the robot in a room where the robot currently is located.

Figure 11:
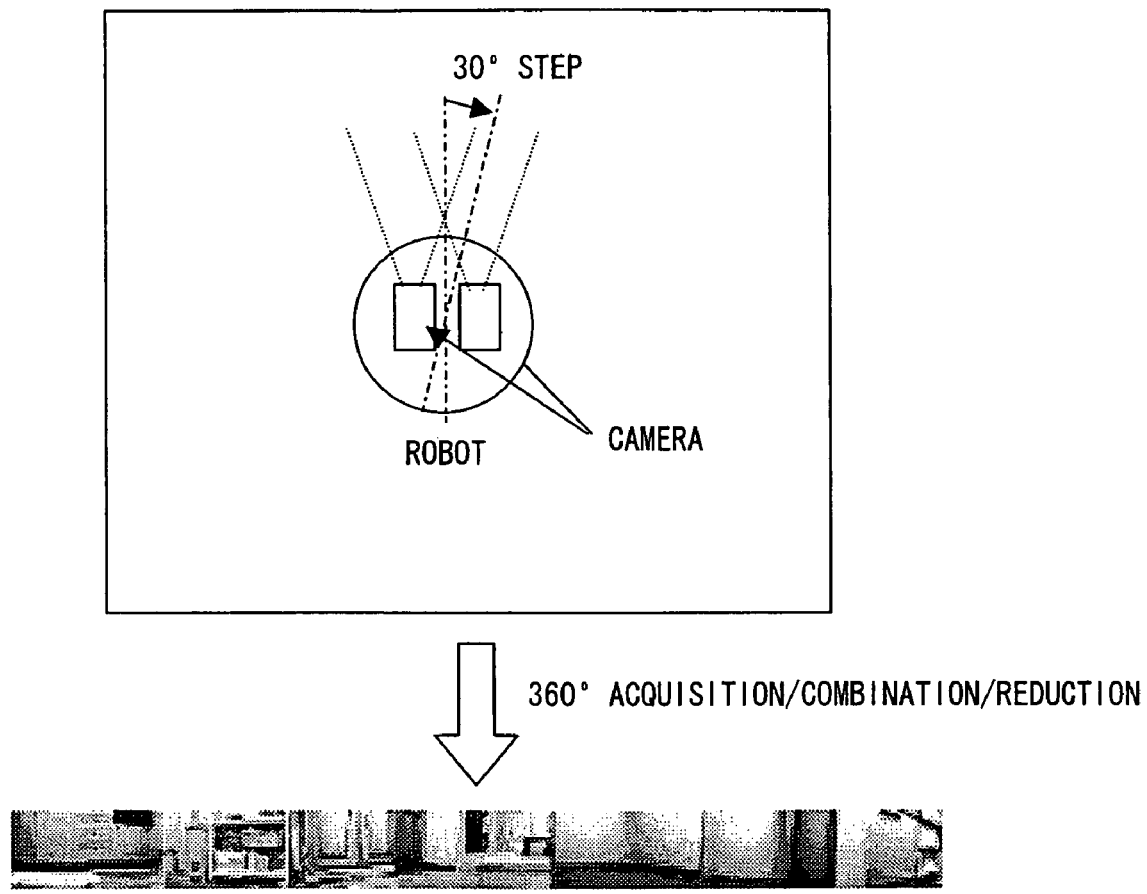
FIG. 11 shows how to take a panoramic picture of a room.

FIG. 11 shows how to take a panoramic picture of a room in order to register in advance the panoramic picture of each room in a building. A 360° panoramic picture can be produced for preparation by locating a robot, for example, at the center of a room, turning a camera, for example, in steps of 30 degrees, taking pictures, and combining them, for example, reducing their sizes. In this case, there is a possibility that matching between the picture taken when identifying the self-position and the currently taken picture may degrade if the currently taken picture is compressed in order to shorten a process time, such as a calculation time, etc., or if it is too clear. Therefore, the level of the currently taken picture is averaged.

Figure 13:
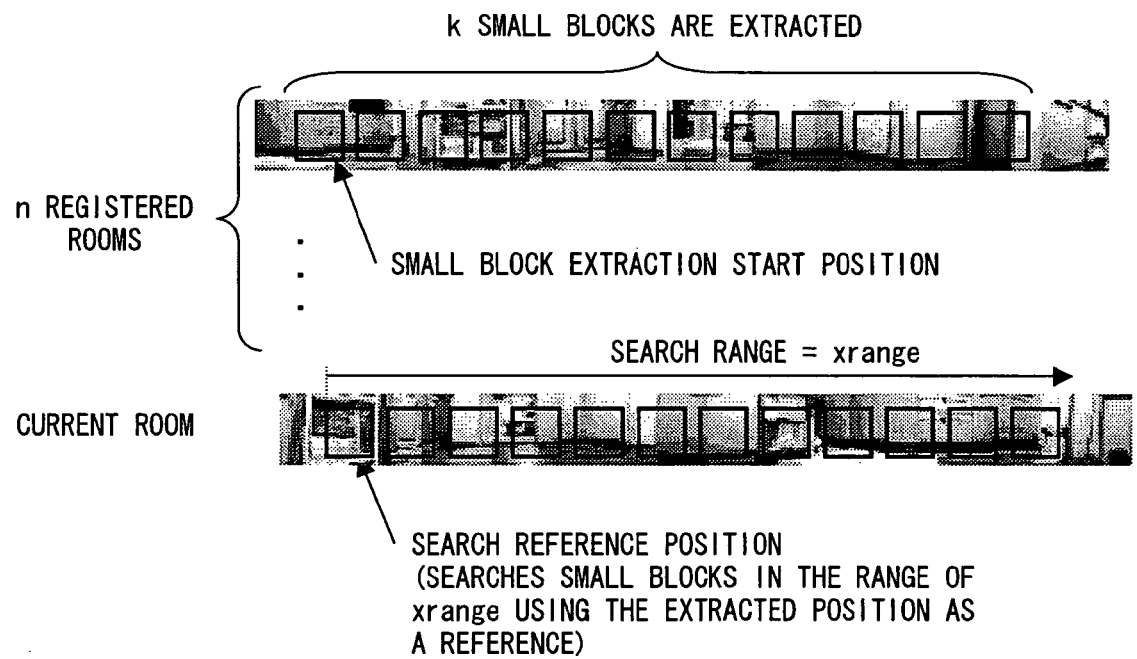
FIG. 13 shows the picture correlation calculation conducted in the identification process.

FIG. 12 is a flowchart showing the process of identifying a room where the robot is located. FIG. 13 shows the picture correlation calculation conducted in the identification process. Firstly, in steps S20 through S22 of FIG. 12, a panoramic picture is taken for preparation, which has been described in FIG. 11, and a reference template that is used in actual position identification is generated.

Specifically, in step S20, the panoramic picture of each room located at an area to which a robot may travel, is taken. In step S21, the size of the panoramic picture is reduced and its level is averaged. In step S22, a plurality of small block pictures are extracted from the panoramic picture at equal pitches, that is, horizontally at equal intervals, the pictures are enlarged or reduced, and a reference template is generated.

The upper picture of FIG. 13 shows examples of pictures extracted as small blocks in this way. For example, k small block pictures are extracted from the panoramic picture of each room for each of the registered pictures of n rooms.

Processes in steps S23 and after of FIG. 12 show the identification process of a room where the robot currently is located. Firstly, in step S23, the panoramic picture of a room where the robot currently is located is taken. In step S24, the size of the panoramic picture is reduced and its level is averaged. In steps S25 and after, the currently taken picture is compared with the reference template.

The lower picture of FIG. 13 shows examples of the extracted pictures of a room where the robot currently is located. The panoramic picture of a room where the robot currently is located is compared with each of the registered pictures of n rooms, using an extraction start position and xrange small block pictures as a search reference position and a search range, respectively.

In step S25 of FIG. 12, it is determined whether such a process has been applied to all the registered rooms. If such a process has not been applied to all the registered rooms, in step S26, it is determined whether all reference block numbers, specifically, k extracted pictures registered for each of the n rooms shown in FIG. 13 have been searched for.

If all the k extracted pictures registered for each of the n rooms shown in FIG. 13 have not been searched for, in step S27, it is determined whether all search range numbers, specifically, the entire search range of xrange pixels from the search reference position in the panoramic picture of a room where the robot currently is located shown in FIG. 13 has been searched for. If the entire search range of xrange pixels from the search reference position in the panoramic picture of a room has not been searched for, in step S28 it is determined whether all enlargement/reduction numbers, specifically, the number of pictures compared with the currently taken room picture of n pictures that are obtained by enlarging and reducing the small block pictures extracted in step S22, reaches n.

If the number does not reach n, in step S29, the correlation calculation between the reference template, specifically, the correlation between the reference template with the process target enlargement/reduction number of the process target small-blocked picture of the process target room and the panoramic picture of the current room designated by the search range number is calculated. Then, in step S30, the enlargement/reduction number is incremented, and the processes in steps S28 onward are repeated.

If in step S28, it is determined that the enlargement/reduction number is more than n, that is, n pictures with an enlargement/reduction number have been all processed, in step S31, a picture with an enlargement/reduction number whose result of the correlation calculation is the smallest of all pictures with a search range number in process is designated as the result of the search in the search position. Then, in step S32, the search range number is incremented, and then the processes in steps S27 onward are repeated. In this case, it is assumed that, for example, distortion equivalent to absolute density difference is calculated for each picture in the correlation calculation. In this case, the smaller the difference is, the larger the matching ratio between pictures becomes.

If in step S27 it is determined that the search range number is more than xrange, it means that the comparison of a picture with a reference block number in process is completed. Therefore, in step S33, the reference block number is incremented and then the processes in steps S26 onward are repeated.

If in step S26 it is determined that the reference block number is more than k, it means that the comparison of a room in process is completed. Therefore, in step S34, a two-dimensional matrix that is determined by both k small block pictures obtained by conducting the correlation calculation of the room and search range xrange is generated. In step S35, cost is calculated, for example, by applying dynamic programming (DP) matching, using the result of the correlation calculation and distance as parameters, and the lowest cost of a room in process is calculated.

Each element of the two-dimensional matrix whose respective number of rows and columns are determined by the k small block pictures and search range xrange becomes the data of a reference template whose correlation calculation value between the current panoramic picture and a picture in each search position is the lowest of the respective n templates obtained by enlarging/reducing the k small blocks shown in FIG. 13.

Distance in DP matching corresponds to the horizontal distance from the search reference position shown in the lower picture of FIG. 13, that is, xrange. In step S35, the lowest cost of a room in process can be calculated by applying general DP matching that calculates cost using the result of correlation calculation and distance as parameters.

Then, in step S36, the room number is incremented, and the processes in and after step S25 are repeated. If it is determined that in step S25 all the rooms are processed, in step S37 a room with the lowest cost of the costs calculated for each room in step S35 is determined to be the room where the robot currently is located, and the process terminates.

Figure 14:
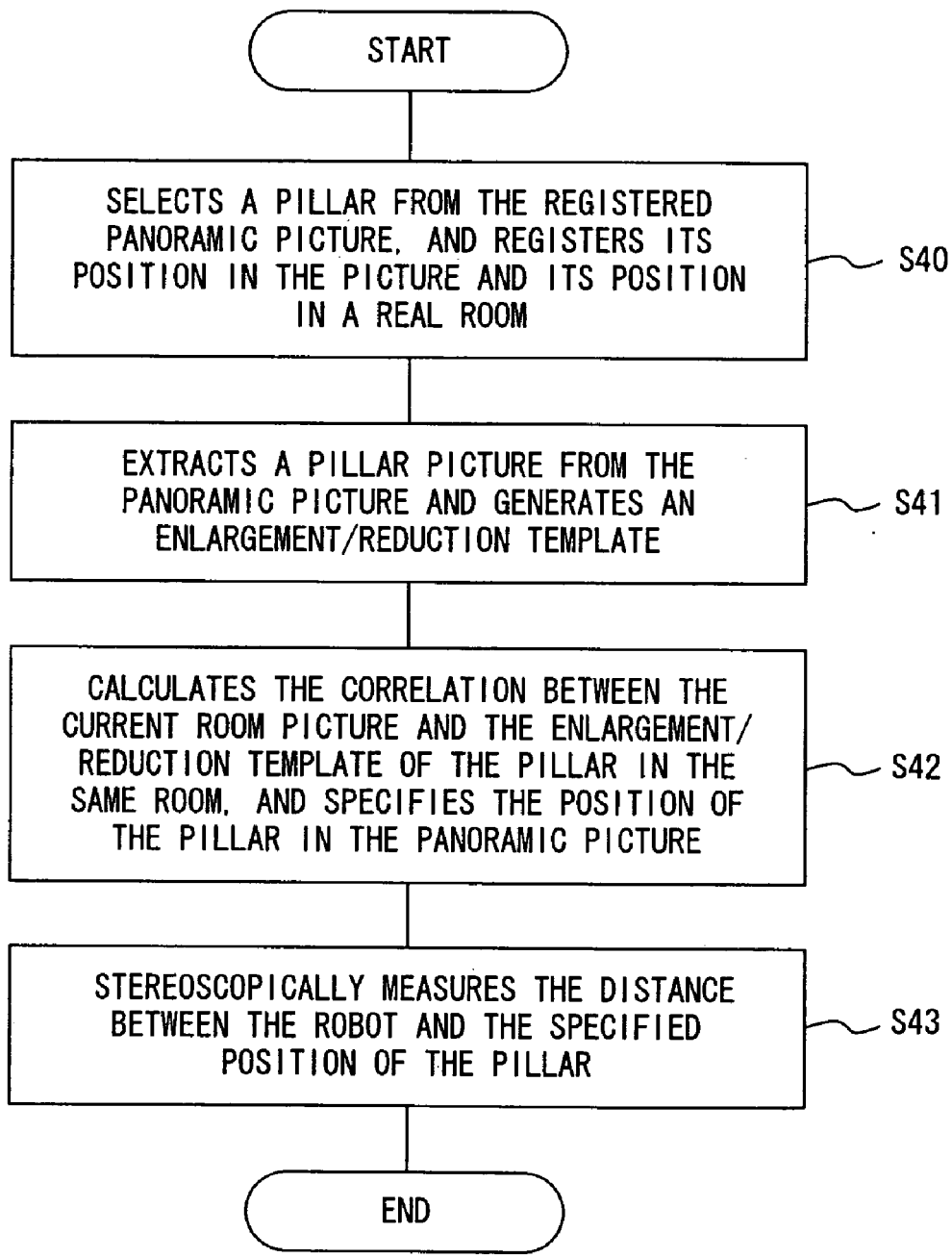
FIG. 14 is a flowchart showing the process of roughly identifying the position of a robot after identifying a room where the robot is located.
Figure 15:
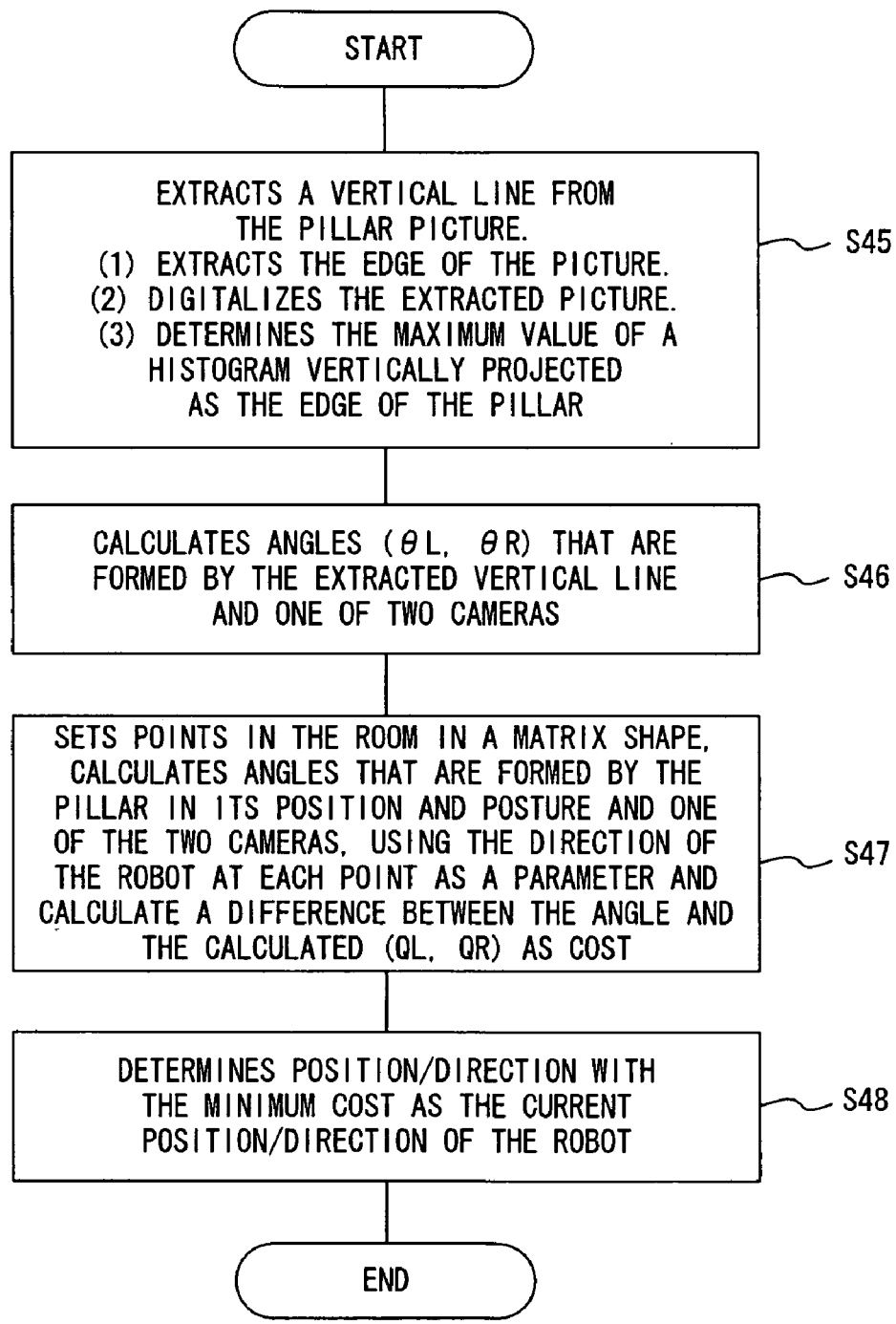
FIG. 15 is a flowchart showing the process of exactly identifying the position of a robot after identifying a room where the robot is located.

FIGS. 14 and 15 are flowcharts showing the process of identifying the position of a robot in a room after a room where the robot is located in the process of FIG. 12 has been identified. FIGS. 14 and 15 are flowcharts showing the processes identifying rough and exact positions of a robot, respectively.

In step S40 of FIG. 14, firstly, prior to the identification of the real position of a robot, a landmark, such as a pillar, is selected in the panoramic picture taken and registered, as described in FIG. 11, and both its position in the picture and its position in the real room are registered. Then, in step S41, the picture of the pillar is extracted from the panoramic picture and an enlargement/reduction template is generated.

Then, in order to identify the rough real position of a robot, in step S42 correlation calculation is applied using the enlargement/reduction template of the pillar in a room where the robot currently is located, that is, the same room as identified in the process of FIG. 12, and the position of the pillar in the current panoramic picture is specified. In step S43, a distance between the robot and the specified pillar is stereoscopically measured, and the rough position of the robot is identified.

Figure 16:
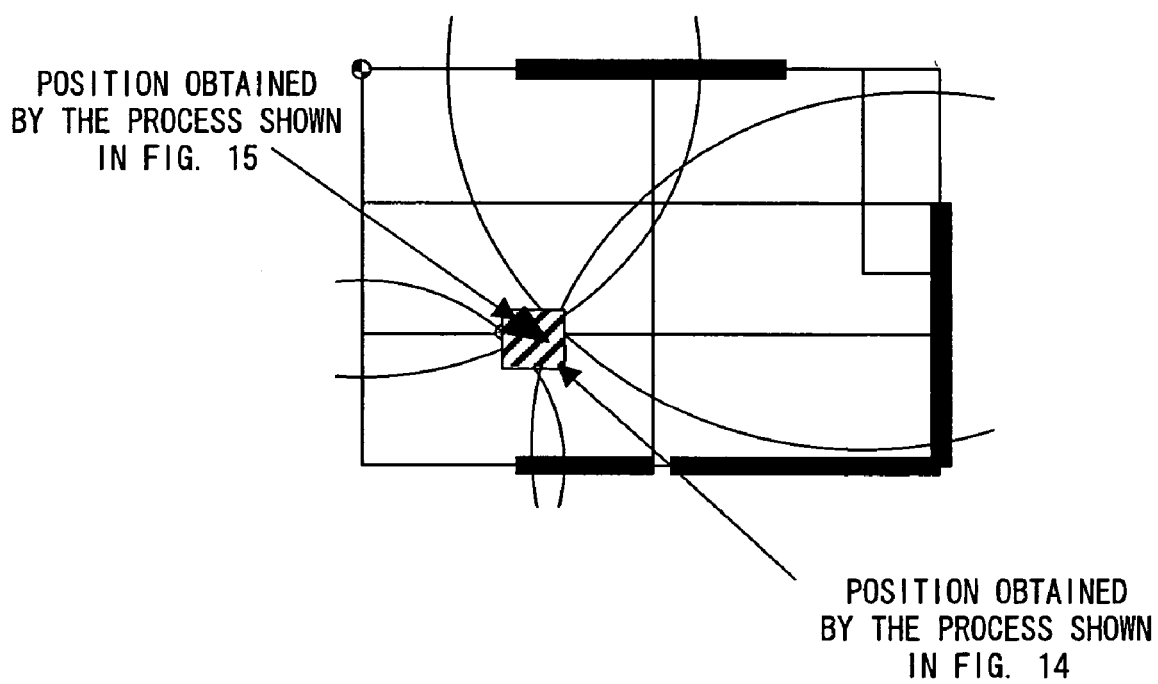
FIG. 16 shows the position of a robot, calculated by the processes shown in FIGS. 14 and 15.

FIG. 16 shows the position of a robot, calculated in this way. In FIG. 16, in step S43, for example, distances from the four corners of a room are calculated, and the intersecting points of the circular arcs of circulars each with each of the distances as a diameter is obtained as the result of the rough position identification of a robot located inside a rectangle.

FIG. 15 is a flowchart showing the process of identifying the exact position of a robot, based on the rough position calculated in FIG. 14. Firstly, in step S45 of FIG. 15, in order to extract a vertical line from the picture of the pillar, (1) the edge of the picture is extracted, (2) the extracted picture is digitized and (3) a histogram vertically projected is calculated. To calculate a histogram vertically projected means to determine an edge with the maximum value as the edge of the pillar, since the histogram value of a low edge, such as a desk, of the vertically detected edges becomes small. Thus, the edge of the pillar is extracted.

Then, in step S46, respective angles formed by the extracted vertical line, that is, the edge of the pillar, and each of the shooting directions of two cameras are calculated.

Then, in step S47, in order to calculate the exact position and direction of the robot in the room, virtual points are set in a matrix shape in the room, and two angles formed by the vertical line of the pillar corresponding to the position/posture of the robot and each of the shooting directions of the two cameras are calculated using the direction of the robot at each point as a parameter, and a value corresponding to the difference the angles calculated in steps S46 and S47 is calculated as cost. In step S48, a position and a direction where the cost is the minimum are calculated as the exact position and direction of the robot. Then, the process terminates.

A triangle in the rectangle shown in FIG. 16 indicates the exact current position and direction of the robot that are identified by the process shown in FIG. 15. The data for the position and direction of a robot that are identified thus is notified to the client, for example, by the radio communication unit 15 shown in FIG. 2, as requested.

Figure 17:
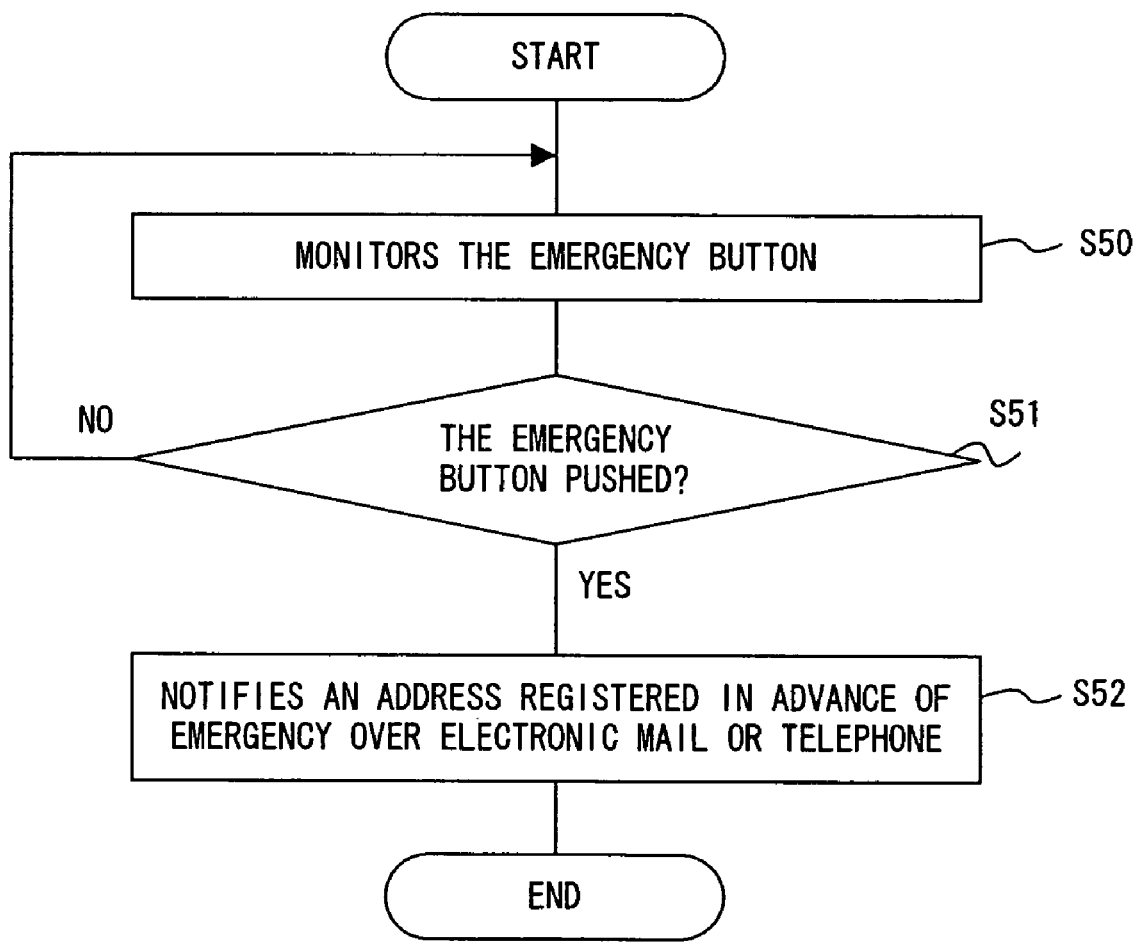
FIG. 17 is a flowchart showing a robot process, in which the robot originates an emergency notice to a remote location.

Next, other preferred embodiments of a remotely controlled robot are described. FIG. 17 is a flowchart showing the remote emergency notice process of a remotely controlled robot. As described in FIG. 4, a robot is provided with an emergency button. For example, if the resident of a building wants to notify a remote place of emergency, he/she can do so by pushing the emergency button.

Specifically, in step S50 of FIG. 17, the emergency button is monitored, and in step S51 it is determined whether the emergency button is pushed. If the button is not pushed, the processes in and after step S50 are repeated. If the button is pushed, in step S52 emergency is notified to an address registered in advance over electronic mail or telephone. Then, the process terminates.

Figure 18:
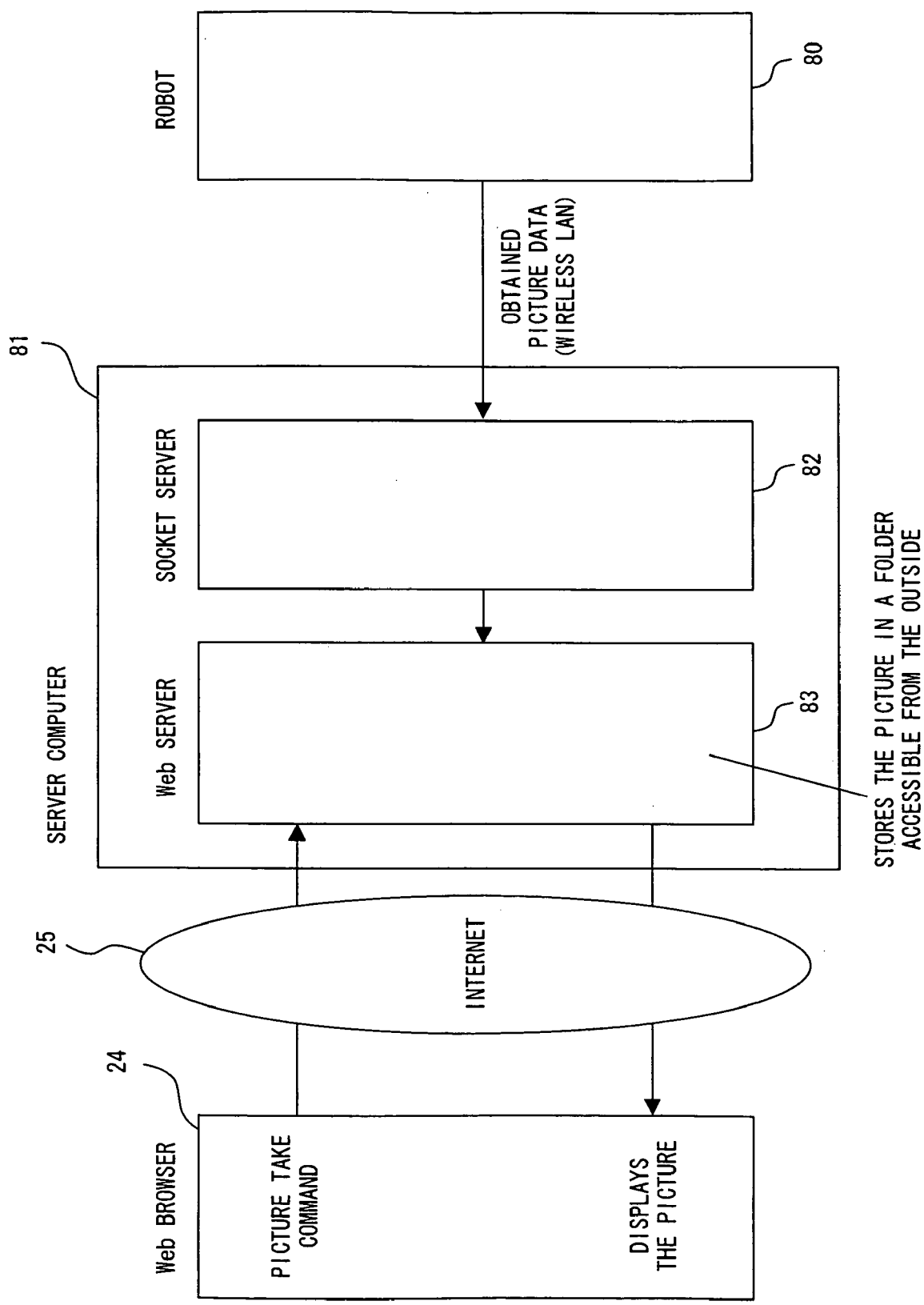
FIG. 18 shows how to remotely check a picture taken by the robot (No. 1).

Next, a method for remotely checking the picture of, for example, a room in a building, that is taken by a robot is described with reference to FIGS. 18 and 19. In FIG. 18, for example, if a robot 80 regularly patrols inside the building and transmits the picture of each room, which it takes, to a server computer 81 provided with a Web server through a wireless LAN, the picture can be remotely referenced by accessing this Web server.

Specifically, the server computer 81 comprises a socket server 82 receiving picture data transmitted from the robot 80, and a Web server 83. The picture transmitted from the robot 80 is stored in a folder on the Web server 83 that can be referenced from the outside. In a remote place, the Web browser 24 issues a picture obtain command to the Web server 83 through the Internet 25, and displays the picture transmitted from the Web server 83 through the Internet 25.

In this case, in FIG. 6, the communication module 62, such as a LAN card, etc., is inserted in a connector.

Figure 19:
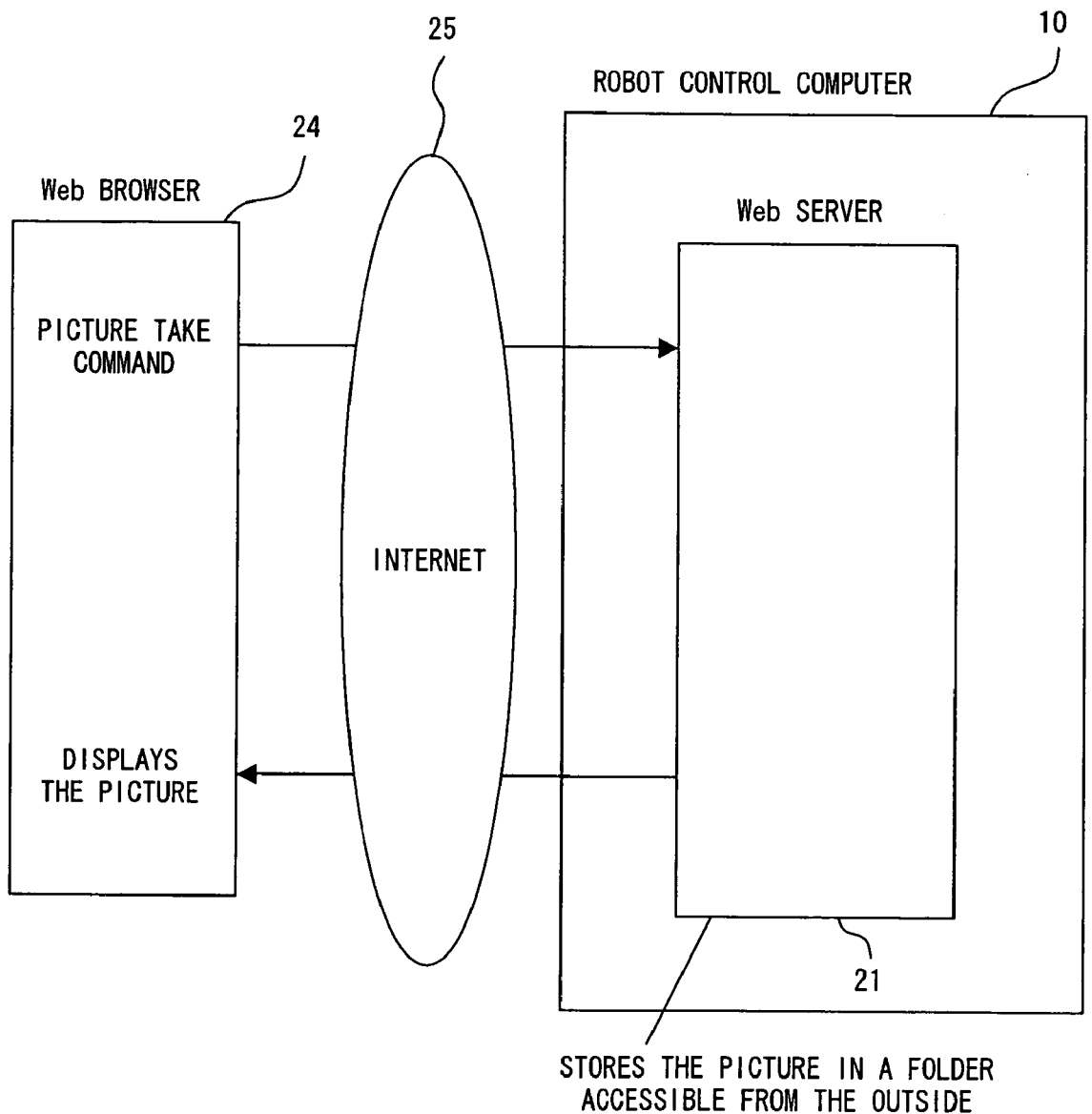
FIG. 19 shows how to remotely check a picture taken by the robot (No. 2).

In FIG. 19, as in FIG. 3, a robot control computer 10 comprises a Web server 21, and the Web browser 24 can refer to the picture by accessing the Web server 21 through the Internet 25. In this case, the communication module 62, such as a PHS card, etc., is inserted in a connector.

Alternatively, when the robot receives a ringer signal a predetermined number of times through the Internet 25, the Web server can start and allow it to be accessed from the outside.

Figure 20:
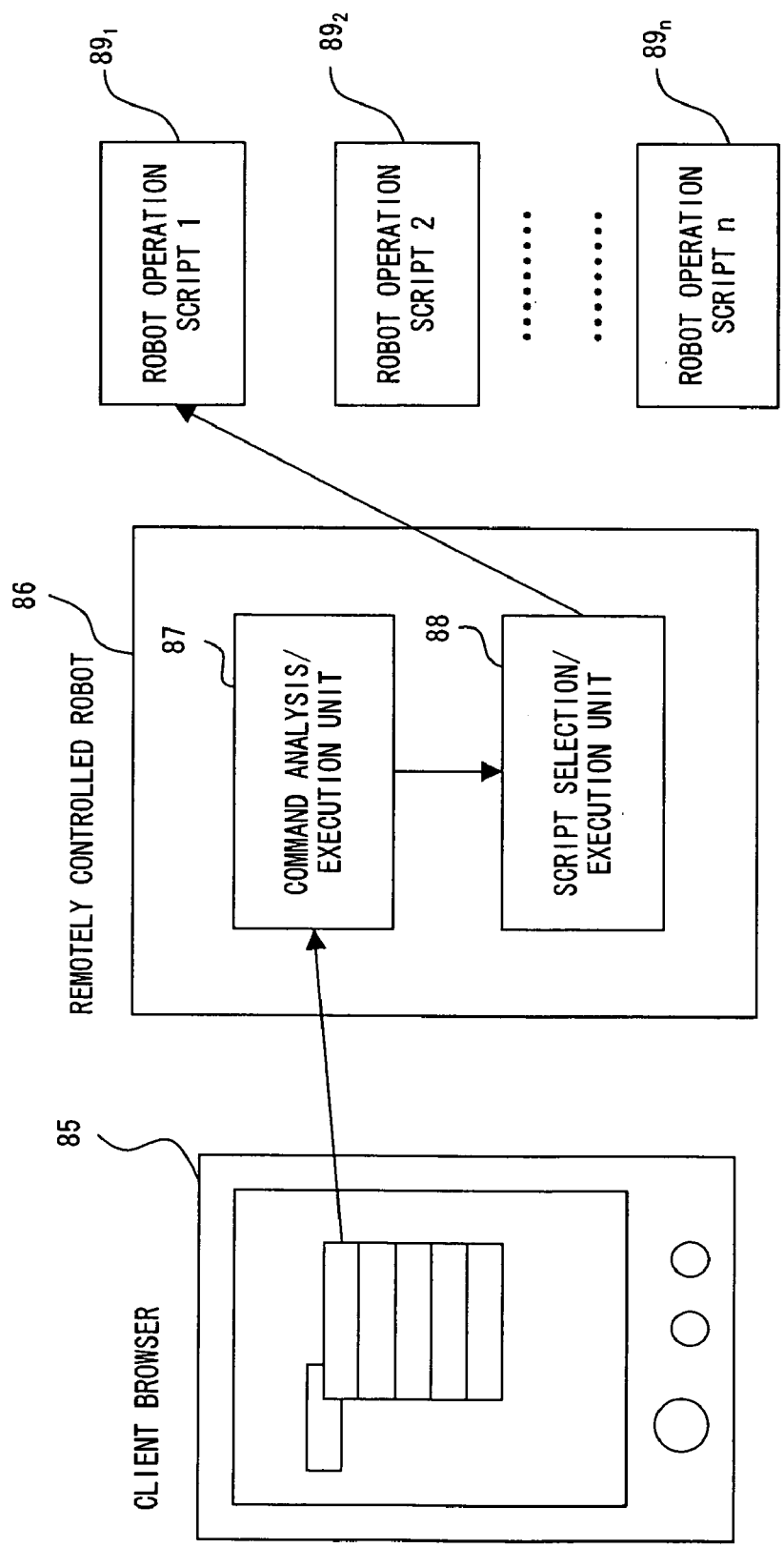
FIG. 20 shows how to make the robot to perform an operation programmed in advance.

Lastly, a method for remotely designating a script stored in a robot and making the robot perform an operation that is programmed in advance, is described with reference to FIG. 20. In FIG. 20, in response to a command from a client browser 85, the command analysis/execution unit 87 of a remotely controlled robot 86 analyzes the command. If the command designates the selection of a script and its execution, a script selection/execution unit 88 selects one of a plurality of robot operation scripts $89_1$ through $89_n$ stored in the robot and performs the operation.

As described in detail above, according to the present invention, a remotely controlled robot can be made to travel to a target destination by designating the destination, for example, in a layout plan displayed on a remote terminal.

A remote terminal can also check the inside picture of a building. Alternatively, the remote terminal can make a robot perform an operation that is programmed in advance. Alternatively, the resident of a building can issue an emergency notice to a remote location.

The present invention aims to provide functions to operate electrical home appliances through the Internet and to remotely monitor the state of a client's home while he/she is away, and the exact self-position identification method of a robot. The present invention can be used in all industries using a remotely controlled robot and in an industry needing to identify an exact self-position of a robot. Specifically, the present invention can be used in a variety of industries, such as electrical home appliance industries, building management industries, etc.

What is claimed is:

1. A robot that can be remotely controlled, comprising:
a layout storage unit for storing a layout plan of a building;
a communication unit for communicating with a remote terminal; and
a travel control unit for controlling travel of a robot to a designated position, wherein: the robot identifies its own position, the robot receives a viewable picture from the remote terminal; a size of the layout picture stored in the memory is converted into a size of the viewable picture received from the remote terminal, and stored; the robot transmits the layout picture containing the identified own position to the remote terminal; the robot receives coordinates of a destination designated from the remote terminal; the robot calculates destination coordinates on a real scale from both a converted size and coordinates of the destination designated by the remote terminal; the robot produces a route to the destination; and the robot travels towards the destination.

2. The remotely controlled robot according to claim 1, further comprising
a step getting over unit for getting over steps in a building, based on the result of step detection by an obstacle detecting sensor.

3. The remotely controlled robot according to claim 1, further comprising
a self-position identification unit for identifying the current position and direction of the robot in the building, wherein
said travel control unit controls the travel of the robot to the designated position, based on the result of the identification.

4. A robot that can be remotely controlled, comprising:
a layout storage unit for storing a layout plan of a building;
a communication unit for communicating with a remote terminal; and
a travel control unit for controlling the travel of a robot to the designated room, wherein: the robot identifies its own position; the robot received a viewable picture from the remote terminal; the robot transmits the layout picture containing the identified its own position to the remote terminal; the robot receives data of name or number of the designated room from the remote terminal; the robot calculates the coordinates of a destination from the designated room using a correspondence table storing in advance the coordinates of a target, such as an entrance for each room; the robot produces a route to the destination; and the robot travels towards the destination.

5. A robot that can be remotely controlled, comprising:
a picture taking unit for taking an inside picture of a building;
a communication unit for transmitting the picture taken by the picture taking unit when the robot regularly/irregularly patrols inside a building, to a computer with memory accessible from the outside through a network;
a step getting over unit for getting over steps in a building, based on a result of step detection by an obstacle detecting sensor;
a rotation unit for changing a shooting direction of the picture taking unit; and
an infrared ray emission/reception unit for emitting/receiving an infrared ray in parallel to the shooting direction of the picture taking unit.

6. The remotely controlled robot according to claim 5, further comprising
a step getting over unit for getting over steps in a building, based on the result of step detection by an obstacle detecting sensor.

7. The remotely controlled robot according to claim 5, further comprising
a rotation unit for changing the shooting direction of the picture taking unit; and
an infrared ray emission/reception unit for emitting/receiving an infrared ray in parallel to the shooting direction of the picture taking unit.

8. The remotely controlled robot according to claim 5, wherein
the computer to which said communication unit transmits the picture is a Web server connected to the Internet.

9. The remotely controlled robot, according to claim 5, wherein said communication unit starts the computer when a ringer signal is transmitted from the outside through the Internet a prescribed number of times.

10. The robot that can be remotely controlled, according to claim 5, further comprising:
a script storage unit for storing the programs of scripts for one or more operations stored in the script storage unit, wherein
said communication unit received the command to execute one of the programs stored in the script storage unit.

11. A robot that can be remotely controlled, comprising:
a command receiving unit for receiving an emergency command from a person in a building;
a communication unit for issuing the emergency command to a predetermined remote terminal according to the command;
a picture taking unit for taking an inside picture of a building;
a rotation unit for changing a shooting direction of the picture taking unit; and
a communication unit for transmitting a picture taken by the picture taking unit to the outside, according to a command on a shooting direction from the outside.

12. A self-position identification method of a robot with a camera whose shooting direction can be changed, comprising of:
taking in advance a panoramic picture of each room to which the robot may travel;
generating a reference picture by extracting a plurality of block pictures from the panoramic picture; and
identifying a room where the robot is located, by applying correlation calculation and DP matching, using both a picture of a same size as the block picture in the panoramic picture taken in a position where the robot is located, and the reference picture, wherein
designating the picture of a landmark, taken in advance, of all the landmarks in the identified room, as a reference template, applying a correlation calculation between the reference template and a picture taken in a position where the robot is located, and calculating a position of the landmark in the taken picture; and
stereoscopically measuring a distance between the robot and each of a plurality of landmarks and identifying the own robot's position and direction in the identified room.

13. The robot self-position identification method according to claim 12, wherein
extracting a vertical line in the taken picture of the landmark;
calculating cost corresponding to a difference between an angle that is formed by each of two shooting directions of two cameras and the direction of the vertical line, and a resulted angle of calculation that is formed by each of the two shooting directions of the two cameras and the direction of the landmark presuming the position and direction of the robot; and
changing the presumed position and direction of the robot and identifying a presumed position and direction of the robot, where the cost becomes the lowest, to be the position and direction of the robot.

14. A robot that can be remotely controlled, comprising:
layout storage means for storing a layout plan of a building;
communication means for receiving designation of a position designated in the layout plan from a remote terminal; and
travel control means for controlling travel of a robot to the designated position, wherein: the robot identifies its own position; the robot receives a viewable picture from a remote terminal; a size of the layout picture stored in the memory is converted into a size of the viewable picture received from the remote terminal, and stored; the robot transmits the layout picture containing the identified own position to the remote terminal; the robot receives coordinates of a destination designated from the remote terminal; the robot calculates destination coordinates on a real scale from both a converted size and coordinates of the destination designated by the remote terminal; the robot produces a route to the destination; and the robot travels towards the destination.

15. A robot that can be remotely controlled, comprising:

picture taking means for taking an inside picture of a building;

communication means for transmitting the picture taken by the picture taking means when the robot regularly/irregularly patrols inside a building, to a computer with memory accessible from the outside through a network;

a step getting over unit for getting over steps in a building, based on a result of step detection by an obstacle detecting sensor;

a rotation unit for changing a shooting direction of the picture taking unit; and an infrared ray emission/reception unit for emitting/receiving an infrared ray in parallel to the shooting direction of the picture taking unit.

* * * * *